United States Patent
Tsai

(10) Patent No.: US 11,400,562 B2
(45) Date of Patent: Aug. 2, 2022

(54) ELECTRICAL SANDER

(71) Applicant: Shang-Che Tsai, Puyan Township, Changhua County (TW)

(72) Inventor: Shang-Che Tsai, Puyan Township, Changhua County (TW)

( * ) Notice: Subject to any disclaimer, the term of this patent is extended or adjusted under 35 U.S.C. 154(b) by 990 days.

(21) Appl. No.: 16/133,029

(22) Filed: Sep. 17, 2018

(65) Prior Publication Data

US 2020/0086457 A1    Mar. 19, 2020

(51) Int. Cl.
| | | |
|---|---|---|
| *B24B 49/10* | (2006.01) | |
| *H02K 7/14* | (2006.01) | |
| *H02P 7/00* | (2016.01) | |
| *B24B 23/02* | (2006.01) | |

(52) U.S. Cl.
CPC ............. *B24B 49/10* (2013.01); *B24B 23/02* (2013.01); *H02K 7/145* (2013.01); *H02P 7/00* (2013.01)

(58) Field of Classification Search
CPC .......... B24B 49/10; H02P 7/00; H02P 29/028; H02P 29/60; H02K 9/227

USPC ...................................... 451/357; 318/3, 558
See application file for complete search history.

(56) References Cited

U.S. PATENT DOCUMENTS 8,890,449 B2 *  11/2014  Suzuki ................... B25B 21/02
                                                     173/15

\* cited by examiner

*Primary Examiner* — David Luo

(57) ABSTRACT

An electrical sander structure has a main body, a control mechanism and a control circuit. The main body has a brushless motor, and an electromagnetic coil in the brushless motor has a slotted concentrated winding brushless DC motor design. The control circuit is further includes a power detecting module, a rated power constraint module, an intelligent temperature control protection module and a rotation control module. The brushless motor is able to adjust the speed according to the load variations and intelligent temperature control protection mechanism, maintain the optimal operating efficiency and continuously operate within the power set by the rated power limit. In turn, the brushless motor can operate at optimum operating efficiency, helping to extend the life of the brushless motor, increasing user productivity and reducing energy losses.

7 Claims, 4 Drawing Sheets

ELECTRICAL SANDER

BACKGROUND OF INVENTION

1. Field of Invention

The present invention relates to an electrical sander, and more particularly to an electrical sander with adjustable rotation speeds.

2. Description of Related Art

Accordingly, the electrical sander is a polishing hand-held machine that uses electric power as a driving source, and a user can use the electrical sander to polish or grind the surface of objects such as metal or wood. However, the winding method for the electromagnetic coil of the motor in the conventional electrical sander is usually slot-less distributed winding design, which has large iron loss and copper loss, resulting in an increase in manufacturing cost and low economic efficiency. Furthermore, the operation rotation speed of the motor is kept constant, regardless of the rise of the pressure load, the operation power is rapidly increased due to the heavier load given by the user during the operation of the motor. In turn, the temperature of the motor rapidly raises up causing the motor to be damaged or stopping the operation. If the load is too heavy, the service life of the motor will be greatly reduced. In severe cases, the motor will be directly damaged, resulting in waste of materials. If the motor does not maintain a constant speed, and the motor will not operate efficiently and cause excessive energy waste.

Therefore, it is desirable to provide an electrical sander to mitigate and/or obviate the aforementioned problems.

SUMMARY OF INVENTION

An objective of present invention is to provide an electrical sander with manual and automatic adjustable power outputs and rotation speeds, which is capable of improving the above-mention problems.

In order to achieve the above mentioned objective, an electrical sander structure has a main body, a control mechanism and a control circuit. The main body has a brushless motor, and an electromagnetic coil in the brushless motor has a slotted concentrated winding brushless DC motor design. The control circuit is further includes a power detecting module, a rated power constraint module, an intelligent temperature control protection module, and a rotation control module. The brushless motor is able to adjust the speed according to the load variations and intelligent temperature control protection mechanism, maintain the optimal operating efficiency and continuously operate within the power set by the rated power limit. With automatic adjustable power outputs and rotation speeds, the brushless motor can operate at optimum operating efficiency, without interrupting the operation.

Other objects, advantages, and novel features of invention will become more apparent from the following detailed description when taken in conjunction with the accompanying drawings.

DETAILED DESCRIPTION OF PREFERRED EMBODIMENT

Figure 1:
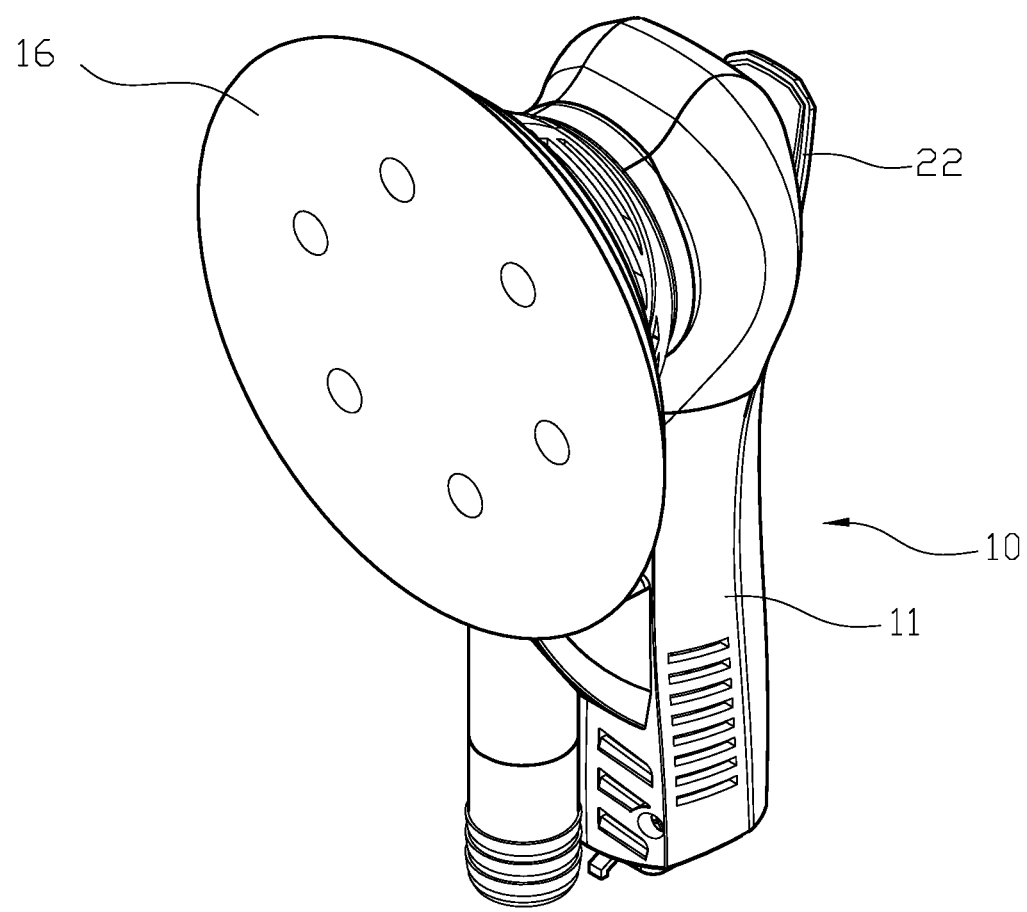
FIG. 1 is a perspective view of a preferred embodiment according to the present invention.
Figure 2:
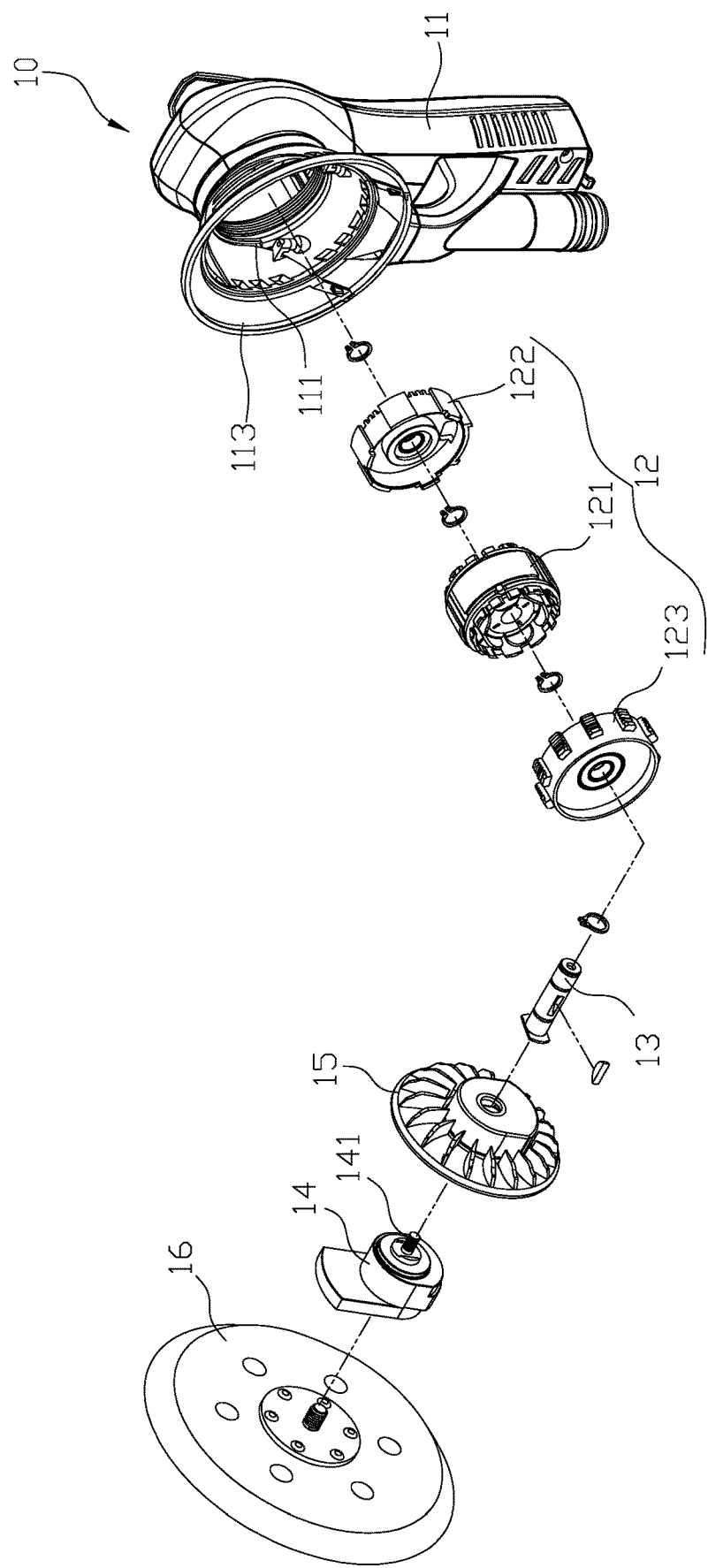
FIG. 2 is an exploded view of the preferred embodiment according to the present invention.

First, please refer to FIGS. 1, 2, 3 and 4. An electrical sander comprises: a main body 10, a control mechanism 20 and a control circuit 30. The main body 10 has a housing 11, a transmission set 12, a motor transmission shaft 13, a mounting base 14, a cooling member 15 and a grinding disc 16. The housing 11 is hollow to form a first chamber 111 and a second chamber 112, the first chamber 111 is provided with an opening 113, and is sequentially installed with the transmission set 12, the motor transmission shaft 13, the cooling member 15 and the mounting base 14. The transmission set 12 includes a brushless motor 121 and an upper and lower brackets 122, 123 for the brushless motor 121. The electromagnetic coil of the brushless motor 121 employs slotted concentrated winding linear design, and drives the motor transmission shaft 13. The mounting base 14 engages with and the cooling member 15, and is connected to the motor transmission shaft 13 via an eccentric shaft 141. The grinding disc 16 is assembled onto outside of the mounting base 14 and located adjacent to the opening 113. The control mechanism 20 is installed onto outside of the housing 11, and has a switch 21 and a pressing plate 22 for outputting a control signal to the control circuit 30 and outputting a power adjusting signal to convert the input power driving the brushless motor 121 of the transmission set 12. The control circuit 30 includes a power detecting circuit 31, a micro-processor 32, a power converter 33, an intelligent temperature control protection module 34 and a motor phase testing module 35. The power detecting circuit 31 includes a power supply module 311, an over current protection module 312 and a low voltage protection module 313. The micro-processor 32 is used for receiving the output control signals and outputting the power adjusting signal proportional to the output control signals. The power converter 33 is composed of a driving module 331 and a set of power switch 332. The power adjusting signal outputted by the micro-processor 32 makes the driving module 331 to output one or more pulses to control the power switch 332 and modulate the input power into driving power. The intelligent temperature control protection module 34 detects the operating temperature of the grinder, when the operating temperature of the grinder is above a preset maximum temperature value, the intelligent temperature control protection module 34 outputs an overheat protection signal to trigger the micro-processor 32 to enter an intelligent temperature control protection mechanism. The motor phase testing module 35 is used for detecting the operating phase of the brushless motor 121 is for the micro-processor 32. The control circuit 30 further includes a power detecting module 36, a rated power constraint module 37 and a rotation control module 38. The power detecting module 36 detects the power variation generated by the brushless motor 121. The rated power constraint module 37 sets a rated power range for the brushless motor 121, and the set value of the rated power can be a single value, an interval value, an upper and lower limit values, a multi-interval values, and multiple point values . . . etc. The rotation control module 38 outputs a rotation limiting signal corresponding to the range set by the rated power constraint module 37 and receives the rotation limiting signal through the micro-processor 32, thereby controlling the maximum range of the power adjustment signal outputted by the micro-processor 32, to achieve the maximum speed of the brushless motor 121.

Figure 3:
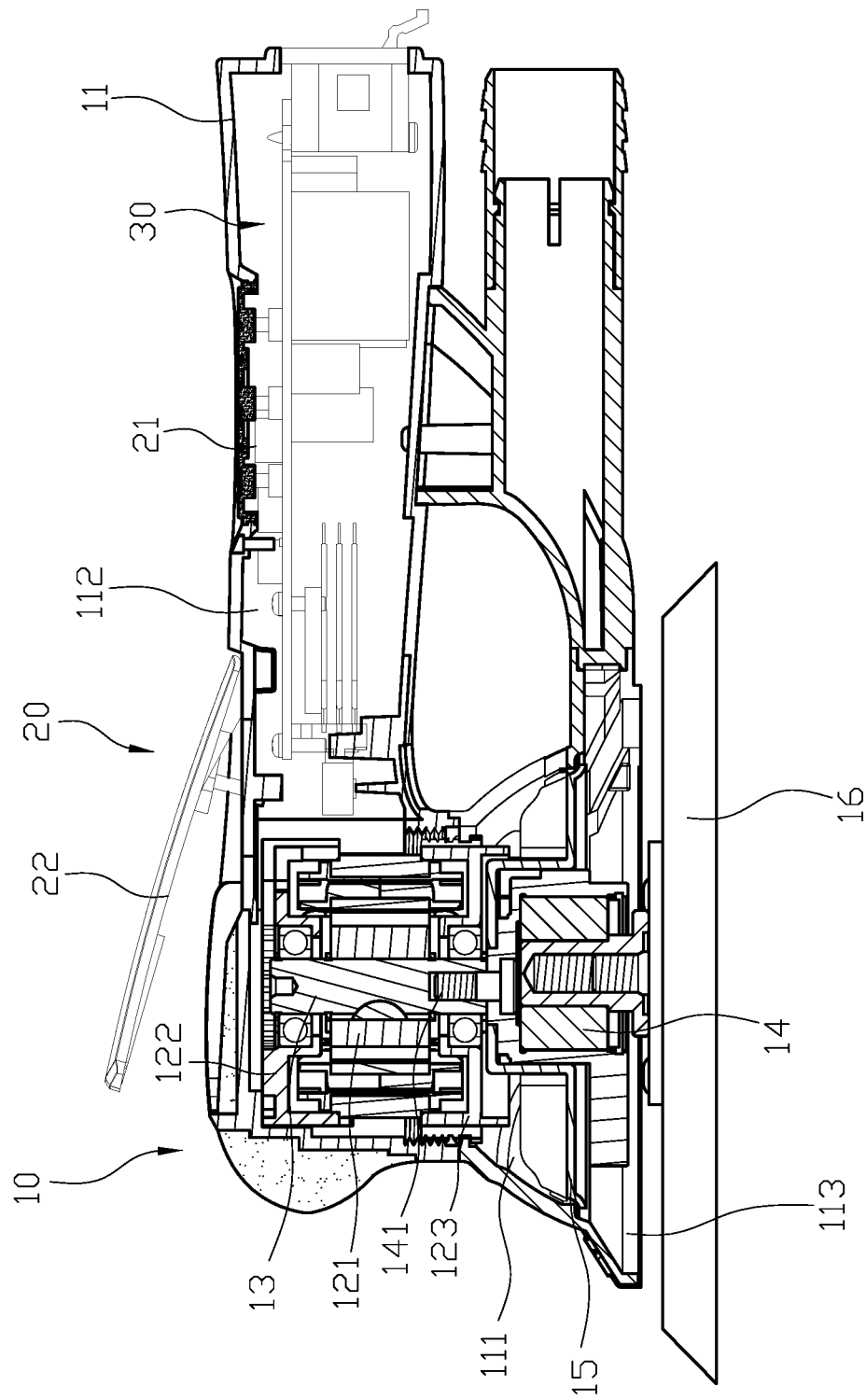
FIG. 3 is a cross-sectional view of the preferred embodiment according to the present invention the micro-processor.
Figure 4:
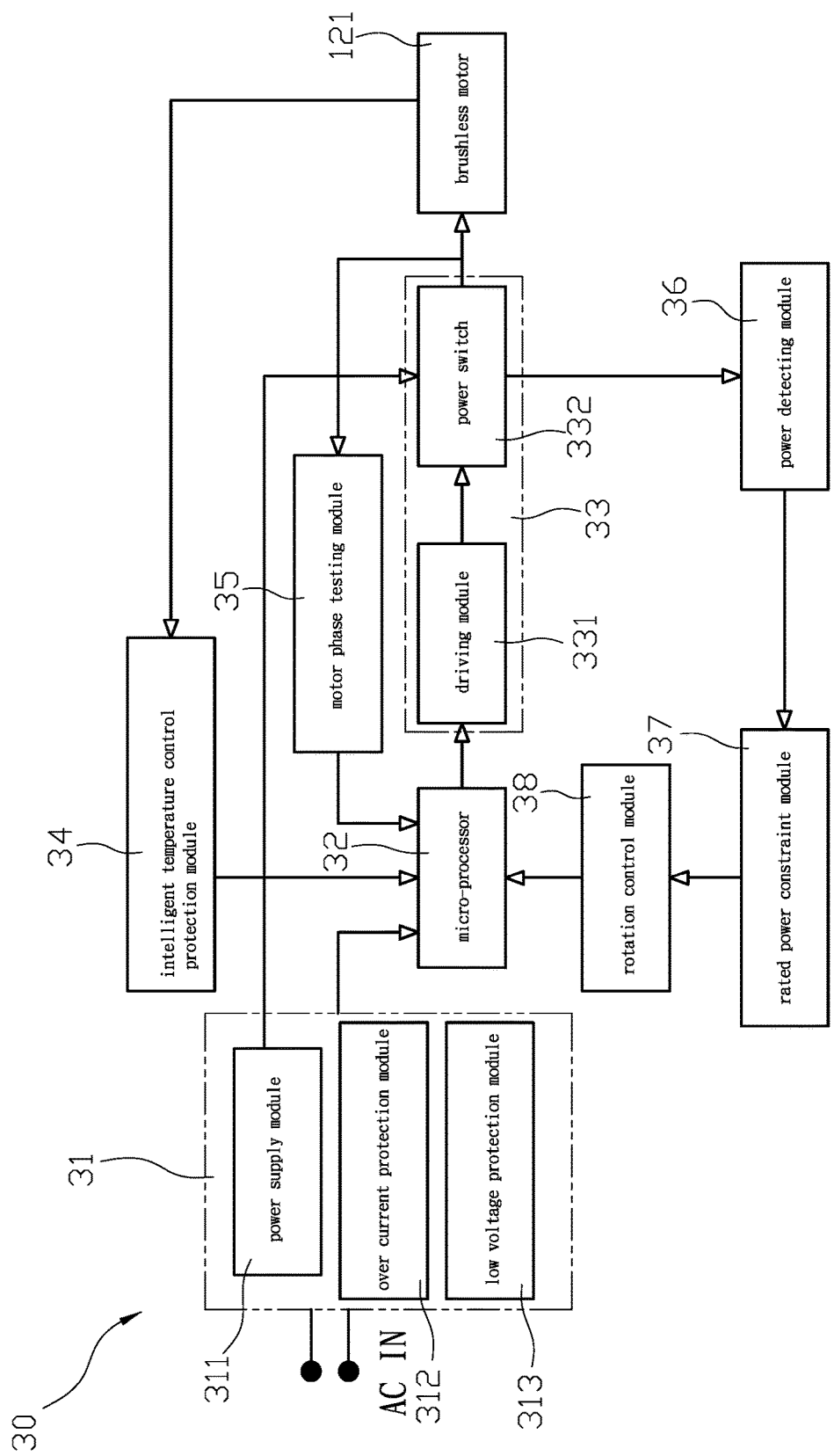
FIG. 4 is a schematic drawing of the control circuit according to the present invention.

The structure of the structure, as shown in FIGS. 3 and 4. The external power source is connected to the main body 10, the switch 21 of the control mechanism 20 is turned on and the pressing plate 22 is pressed to generate the output control signal to control the control circuit 30. The output control signal is transmitted to the micro-processor 32 of the control circuit 30, and the micro-processor 32 outputs a power adjusting signal proportional to the output control signal. According to the power adjusting signal, the power outputted by the power converter 33 for driving the brushless motor 121 is determined. The brushless motor 121 rotates to move the motor transmission shaft 13 through the mounting base 14 to rotate the grinding disc 16. When the base 14 rotates, the cooling member 15 is simultaneously rotated to bring the heat generated by the transmission set 12. The control circuit 30 detects the operating power of the brushless motor 121 via the power detecting module 36, and generates a control signal to the rotation control module 38 according to the predetermined rated power range set by the rated power constraint module 37. The rotation control module 38 interprets and issues a rotation limiting signal to the micro-processor 32, causing the micro-processor 32 to receive the output control signal and the rotation limiting signal. Then, the micro-processor 32 outputs the power adjusting signal that meets the output control signal and the limit signal, thereby controlling the driving power and rotation speed of the brushless motor 121.

When the user performs the grinding operation with the grinding disc 16 of the main body 10, the power detecting module 36 detects a real-time operating power of the brushless motor 121. When the load applied to the brushless motor 121 is increased and the operating power has reached the rated power or exceeded the rated power, the rated power constraint module 37 outputs a control signal to the rotation control module 38, thereby changing the rotation limiting signal of the rotation control module 38 and outputting the rotation limiting signal to the micro-processor 32 to control the maximum speed of the brushless motor 121. Because the speed of the brushless motor 121 affects the operating power, when the maximum speed of the brushless motor 121 is limited, the unused power of the driving power allows some adjust tolerance between the speed and the torque of the brushless motor 121, to maintain or reduce the operating power of the brushless motor 121 which meets the rated power range set by the rated power constraint module 37. Therefore, the brushless Motor 121 is maintained in an optimum operating efficiency and continuously operates within the power range set by the rated power constraint module 37. Meanwhile, the output power of the brushless motor 121 is permanently maintained in a safe range, with varying operating loads, the change of the speed of the brushless motor 121 is continuous, controllable, not just only ON/OFF or a few segments, which greatly enhances the practicability of the structure.

In actual operation for the embodiment, when the rated power constraint module 37 of the main body 10 limits the rated power to 300 W, the user applies 5 kg load during the operation, the rotation speed of the brushless motor 121 of the main body 10 reaches 10,000 rpm, and the running power is detected as 250 W by the power detecting module 36. However, the user wants to speed up the operation speed or other factors need to increase the operating load to 10 Kg, the operating power of the brushless motor 121 is detected as 350 W via the power detecting module 36, exceeding the rated power set by the rated power constraint module 37 as 300 w, at which time the rated power constraint module 37 transmits a signal to the rotation control module 38 to reduce the rotation speed of the brushless motor 121 until the power detecting module 36 detects that the power is lowered to 300 w. alternatively, When the brushless motor 121 does not reach the rated power limit, it automatically increases the speed to meet the rated power 300 W set by the rated power constraint module 37, so that the brushless motor 121 keeps the best operation efficiency and continuous operate at the rated power limit. In addition, in the intelligent temperature control protection mechanism, the optimal operating temperature, the interval and the upper and lower limits etc. of the operating temperature of the motor cab be set, and the speed control module is used to change the rotational speed to control the motor temperature within the optimal operating temperature.

With the structure of the above specific embodiment, the following benefits can be obtained: the main body 10 utilizes the control circuit 30 to convert input power into driving power to operate the brushless motor 121, and according to the detection, limitation and adjustment of the power detecting module 36, the rated power constraint module 37 and the rotation control module 38, the brushless motor 121 is able to adjust the rotation speed according to the load change, maintain the optimal operating efficiency, and continue the operation within the power set by the rated power limit. Therefore, the brushless motor 121 is able to operate at an optimum operating efficiency, which helps to extend the life of the brushless motor 121, increases productivity and reduces energy efficiency loss.

The motor type used in the present invention is the brushless motor, and the motor winding design is slotted concentrated winding linear brushless DC motor design, which has less iron loss and copper loss and save a large amount of motor material, furthermore, the same motor efficiency helps to reduce costs and energy losses.

Although the present invention has been explained in relation to its preferred embodiment, it is to be understood that many other possible modifications and variations can be made without departing from the spirit and scope of invention as hereinafter claimed.

What is claimed is:

1. An electrical sander comprising: a main body, a control mechanism and a control circuit; the main body having a housing, a transmission set, a motor transmission shaft, a mounting base, a motor transmission shaft and a mounting base, which can be locked or bonded or integrally formed or fused to make it firm, a cooling member and a grinding disc; the housing having a first chamber and a second chamber, the first chamber provided with an opening and containing the transmission set, the motor transmission shaft, the cooling member and the mounting base; the transmission set comprising a brushless motor and upper and lower brackets for the brushless motor; an electromagnetic coil in the brushless motor having a slotted concentrated winding linear brushless DC motor design and configured to drive the motor transmission shaft, the mounting base engaging the cooling member and connected to the motor transmission shaft via an eccentric shaft, the mounting base configured for assembly with the grinding disc to position the grinding disc adjacent to the opening, the control mechanism mounted outside of the housing and configured to output control signals to the control circuit, the control circuit outputting driving power to the brushless motor of the transmission set;

wherein the control circuit further comprises: a power detecting module, a rated power constraint module, a rotation control module and an intelligent temperature control protection module; the power detecting module is configured to detect power changes in the brushless motor, the rated power constraint module is configured to set an output power of the brushless motor, and the rotation control module is configured to control a maximum rotation speed of the brushless motor corresponding to the rated power constraint module.

2. The electrical sander as claimed in claim 1, wherein the control circuit further comprises a microprocessor, a power converter, a intelligent temperature control protection module, and a motor phase testing module.

3. The electrical sander as claimed in claim 2, wherein the power detecting module further comprises: a power supply module, an over current protection module, and a low voltage protection module.

4. The electrical sander as claimed in claim 2, wherein the microprocessor is configured to generate a power adjusting signal for controlling the maximum rotation speed of the brushless motor according to the rotation limiting signal.

5. The electrical sander as claimed in claim 2, wherein the power converter comprises a driving module and a plurality of power switches, and with the power adjusting signal outputted by the microprocessor, the driving module outputs one or multiple pulses to control the power switches to transform an input power to a driving power.

6. The electrical sander as claimed in claim 2, wherein the intelligent temperature control protection module detects an operating temperature of the electrical sander and outputs a protection signal to signal the microprocessor, wherein the optimal operating temperature, the interval and the upper and lower limits etc. of the operating temperature of the motor cab be set, and the speed control module is used to change the rotational speed to control the motor temperature within the optimal operating temperature.

7. The electrical sander as claimed in claim 2, wherein the motor phase testing module is configured to detect an operating phase of the brushless motor.

\* \* \* \* \*